United States Patent [19]

Terai et al.

[11] Patent Number: 5,437,470
[45] Date of Patent: Aug. 1, 1995

[54] AIR BAG LID STRUCTURE INCLUDING A MAIN LID AND A SUB LID

[75] Inventors: Takehiro Terai, Atsugi; Shigeki Tatsumi, Hiratsuka, both of Japan

[73] Assignee: Nissan Motor Co., Ltd., Yokohama City, Japan

[21] Appl. No.: 221,571

[22] Filed: Apr. 1, 1994

[30] Foreign Application Priority Data

| Apr. 2, 1993 | [JP] | Japan | 5-76971 |
| Apr. 2, 1993 | [JP] | Japan | 5-76996 |
| Apr. 2, 1993 | [JP] | Japan | 5-77004 |
| Apr. 2, 1993 | [JP] | Japan | 5-77013 |

[51] Int. Cl.⁶ ............................................. B60R 21/20
[52] U.S. Cl. ............................ 280/728.3; 280/732
[58] Field of Search ............... 280/728 B, 732, 728 A, 280/730 R, 728 R, 731, 752

[56] References Cited

U.S. PATENT DOCUMENTS

| 3,887,214 | 6/1975 | Brawn | 280/730 R |
| 4,893,833 | 1/1990 | Di Salvo et al. | 280/728 B |
| 4,989,896 | 2/1991 | DiSalvo et al. | 280/728 B |
| 5,072,967 | 12/1991 | Batchelder et al. | 280/732 |
| 5,082,310 | 1/1992 | Bauer | 280/728 B |
| 5,152,548 | 10/1992 | Zushi | 280/728 B |
| 5,154,444 | 10/1992 | Nelson | 280/728 B |
| 5,183,288 | 2/1993 | Inada et al. | 280/732 |
| 5,183,289 | 2/1993 | Zeller et al. | 280/728 B |
| 5,209,510 | 5/1993 | Mamiya | 280/732 |
| 5,256,354 | 10/1993 | Chadwick | 280/732 |
| 5,282,647 | 2/1994 | Barnes | 280/732 |

FOREIGN PATENT DOCUMENTS

| 3-16555 | 2/1991 | Japan . | |
| 0086653 | 4/1991 | Japan | 280/728 B |
| 5004556 | 1/1993 | Japan | 280/728 A |
| 5050893 | 3/1993 | Japan | 280/732 |
| 5185898 | 7/1993 | Japan | 280/752 |
| 5229367 | 9/1993 | Japan | 280/728 B |

*Primary Examiner*—Brian L. Johnson
*Assistant Examiner*—Peter C. English
*Attorney, Agent, or Firm*—Foley & Lardner

[57] ABSTRACT

A lid structure for an air bag system capable of preventing passengers on a vehicle from injuring themselves by inflating an air bag when the vehicle crashes. The lid structure includes a main opening and a sub opening through which the air bag can inflate outside of an instrumental panel. A main lid is provided for closing the main opening and a sub lid is provided for closing the sub opening. The sub lid is formed from a weakened part of the instrumental panel and is easily broken by the inflating force of the air bag. To avoid removal of the sub lid from the panel a deformable attachment is secured to the sub lid and the instrument panel.

5 Claims, 11 Drawing Sheets

AIR BAG LID STRUCTURE INCLUDING A MAIN LID AND A SUB LID

BACKGROUND OF THE INVENTION

This invention relates to a lid structure for an air bag system capable of preventing passengers in a vehicle from injuring themselves from inflation of an air bag during crashing of the vehicle.

Japanese Unexamined Utility Model Publication No. 3-16555 discloses a conventional lid structure through which an air bag inflates instantly when a vehicle is in a collision. In the structure of this prior art, an instrumental panel is provided with one opening which is formed on an assistant-seat side and through which the air bag can inflate outside of the panel. Normally, the opening is closed by a lid having an outer surface formed continuously with an outer surface of the instrumental panel. In the vicinity of a front part of a vehicle body, the lid is attached to the instrumental panel by mounting members. Provided inside of the opening of the panel is an air bag unit, which includes the air bag accommodated in a casing of resin and supported by a reinforcement to inflate in an emergency.

In operation, as soon as the vehicle crashes, the air bag begins to inflate. The air bag applies an inflating force on the lid such that the lid deforms and bends about portions of the lid which come into contact with the mounting members. Consequently, the opening is opened and then the air bag expands into the interior of the vehicle. In the lid structure as mentioned above, the opening must be formed to have a size enough to inflate the air bag smoothly and certainly.

However, in this arrangement, the lid for closing the openings is larger than the corresponding opening. Consequently, molding dimensions of the opening and the lid deviate from required dimensions. Consequently, such deviation exerts serious influences upon the conformity therebetween and the continuity between the surface of the lid and the surface of the instrumental panel. Thus, it causes the quality of the assembly to be lowered and causes the assembling operation to be difficult.

SUMMARY OF THE INVENTION

It is an object of the present invention to provide a lid structure for an air bag system capable of inflating an air bag smoothly, in which an opening and a lid for closing this opening are formed of a small size.

It is another object of the present invention to provide a lid structure capable of improving the quality of assembly with the lid and the assembling workability.

The objects of the invention described above can be accomplished by a lid structure for an air bag system of a vehicle, comprising:

a main opening provided on an instrumental panel for the vehicle, the main opening being adapted so that an air bag of the system passes through the main opening when inflating the air bag;

a main lid for closing the main opening, the main lid being opened by the air bag in the process of inflating;

a sub lid defined by weakened parts of the instrumental panel to be easily broken by the air bag, the sub lid being integral with the instrumental panel, the weakened parts being extending from the main opening, whereby the weakened parts are broken by inflating force of the air bag affecting onto the sub lid to thereby cause the sub lid to be opened so as to form a sub opening which is integral with the main opening; and an attachment provided on a back surface of the instrumental panel, the attachment including movable parts fixed to the sub lid and immovable parts fixed to the instrumental panel.

In the present invention, when the air bag is inflated, the main lid is opened so that the conventional main opening opens outside and furthermore, due to a force derived from the expansion of the air bag onto the sub lid which is integral with the instrumental panel, the weakened parts are broken to open the sub lid so that the sub opening is formed to be continuous with the main opening. Therefore, because the instrumental panel has not only the main opening but also the sub opening which is formed at the inflation of the air bag, the air bag can be inflated into an interior of the vehicle even if the main opening is formed of a smaller size.

Furthermore, since the attachment consists of the movable parts and the immovable parts arranged on the back surface of the instrumental panel, wherein the movable parts are fixed to the sub lid and the immovable parts are fixed to the instrumental panel, there is no possibility of removal of the sub lid from the instrumental panel. Additionally, due to such arrangement of the attachment on the panel, the movable parts can move together with the sub lid. Thus, the sub lid can be easily bent to the interior of the vehicle to ensure it forms the sub opening.

BRIEF DESCRIPTION OF THE DRAWINGS

FIG. 8A and 8B show a connecting part of FIG. 7, in which FIG. 8A is a plan view thereof and FIG. 8B is a side view thereof;

DETAILED DESCRIPTION OF THE PREFERRED EMBODIMENTS

Figure 1:
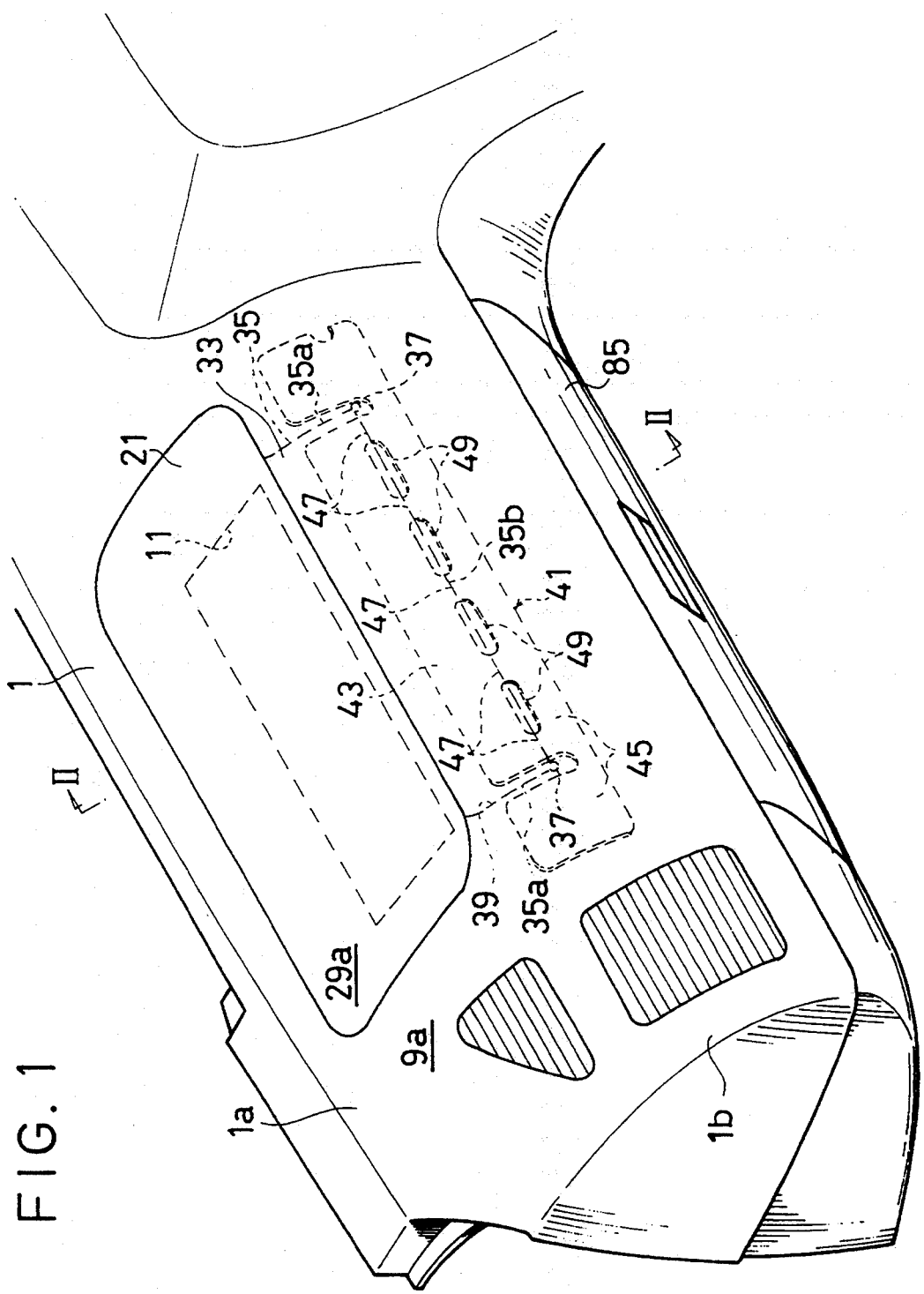
FIG. 1 is a perspective view showing a lid structure for an air bag system according to a first embodiment of the present invention.

As shown in FIG. 1, an instrumental panel 1 is provided on a front side of an interior of a vehicle (not shown). On an assistant-seat side, the instrumental panel 1 includes an upper surface 1a which is substantially even (flat or horizontal) and is positioned on a front side of the interior, and a side surface 1b which is obliquely curved from the upper surface 1a to a rear side of the interior.

Figure 2:
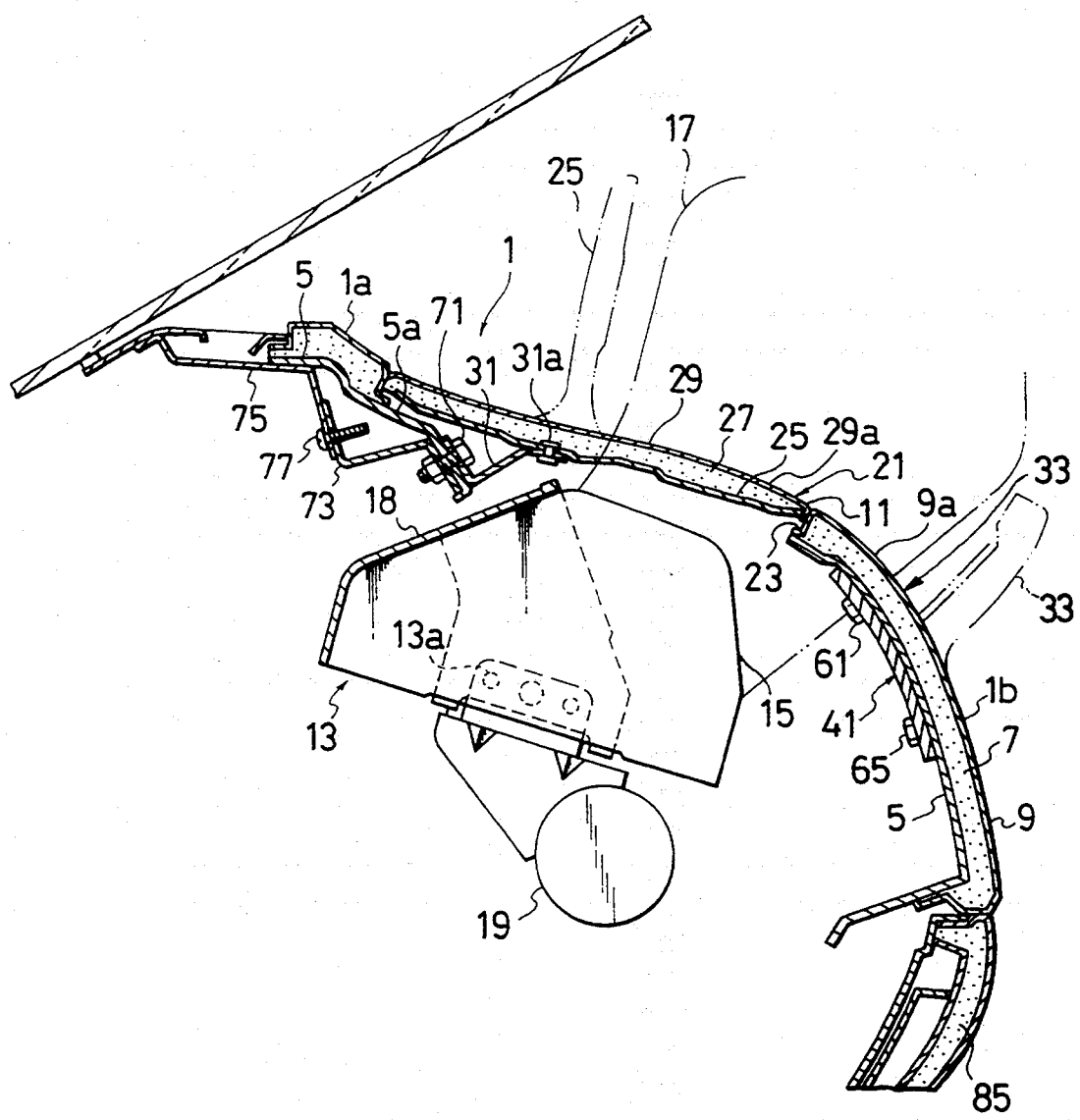
FIG. 2 is a sectional view taken along the line II—II of FIG. 1.

In FIG. 2, the instrumental panel 1 comprises a metallic panel body 5, a resinous pad 7, and a resinous outer sheath 9. The pad 7 is covered by the outer sheath 9 and is secured to the panel body 5.

Provided in the panel body 5 is a rectangular main opening 11, which is arranged in the vicinity of the upper surface 1a of the instrumental panel 1, and in which an air bag unit 13 is installed. The air bag unit 13 includes an air bag 17 accommodated in a casing 15 of resin to inflate in an emergency. The casing 15 is supported by a steering member 19 through the intermediary of a guide plate 18.

The main opening 11 is provided on a peripheral edge thereof with a step shaped fitting part 23 into which a main lid 21 is fitted. The main lid 21 comprises a lid body 25, a pad 27, and an outer sheath 29. A lid-supporting member 31, which is secured to the lid body 25 by means of rivets etc., is arranged in the substantial middle of a back surface of the main lid 21. Provided at the back of a front part of the main opening 11 is a mounting part 5a of the panel body 5, which is deformed obliquely and downward therefrom and to which the lid-supporting member 31 is fixed by a bolt/nut 71. One end of the mounting part 5a is fastened to one end of an anchoring bracket 73 and the other end thereof is fastened to a connecting bracket 75 by a bolt/nut 77. The connecting bracket 75 is secured to the panel body 5 of the instrumental panel 1. Owing to such arrangement, the main lid 21, which is supported by the instrumental panel 1, can close the main opening 11.

Figure 3:
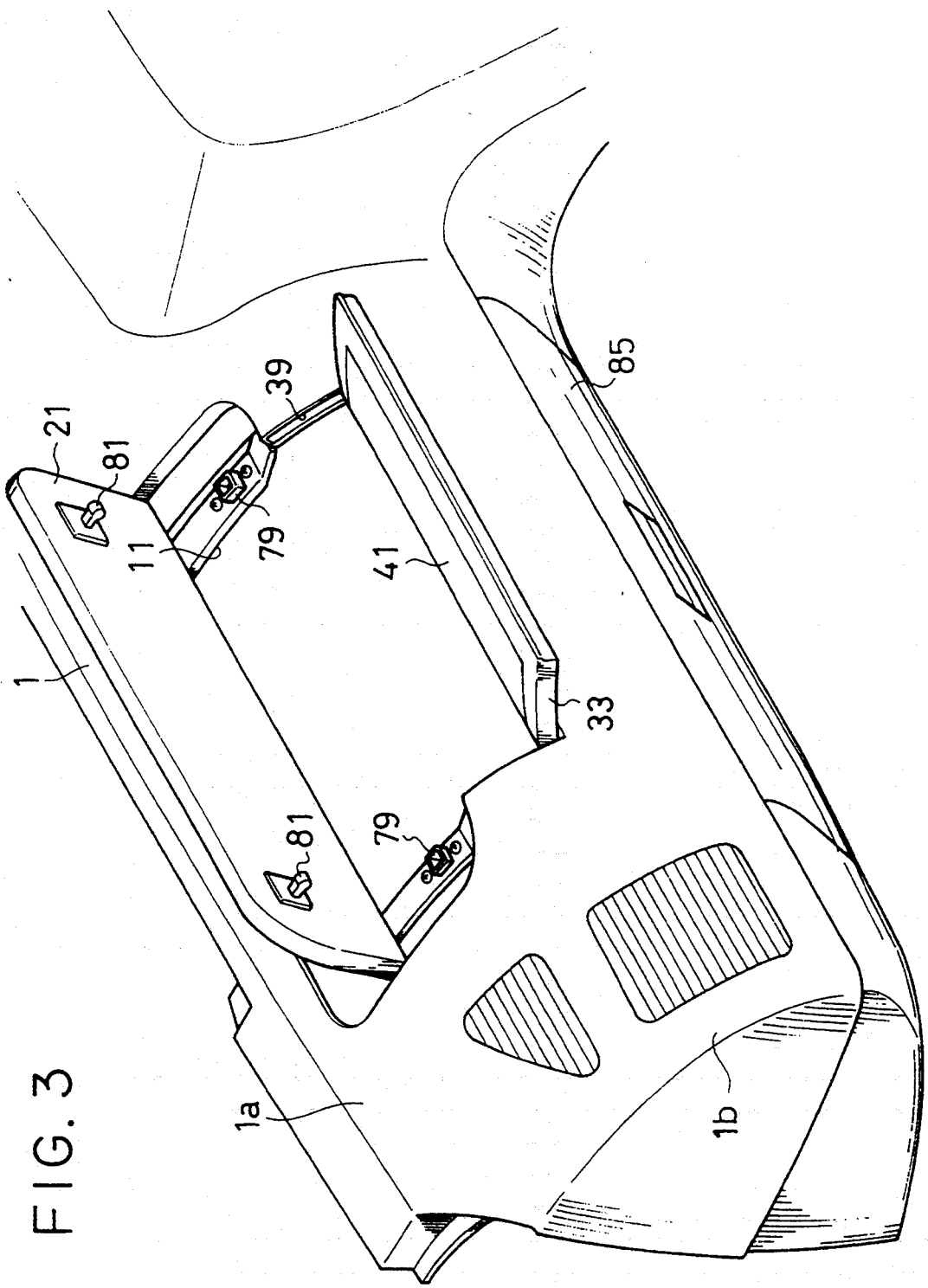
FIG. 3 is a sectional view taken along the line II—II of FIG. 1.

As shown in FIG. 3, lid-locks 79 are mounted on both sides of the main opening 11 in the direction of vehicle-width and pins 81 are arranged on a back surface of the main lid 21, corresponding to the lid-locks 79. Each of the pins 81 has an enlarged head to elastically engage with each of the lid-locks 79. Thus, the main lid 21 is arranged in position on the panel body 5 through the intermediary of the lid-locks 79 and the pins 81. Further, the instrumental panel 1 is formed in such a manner that a top surface 9a of the sheath 9 is continuous with a top surface 29a of the main lid 21 under a closed condition thereof.

When an expanding force of the air bag 17 is exerted on the back surface of the lid 21, the main lid 21 is bent at a connecting part 31a with the lid-supporting member 31 to open the main opening 11.

On the other hand, a sub lid 33 is formed adjacent to the main opening 11 on the instrumental panel 1, as shown in FIG. 1. The sub lid 33, which is defined by a weakened part 35 of a groove formed in the panel body 5, is so formed as to be rectangular and integral with the instrumental panel 1. The weakened part 35 comprises two lateral breakable sections 35a extending from both sides of the main opening 11 downwardly, and a lower breakable section 35b interconnecting with lower ends of the lateral breakable sections 35a. At each lower end of the section 35a, there is provided a circular through hole 37 which is of a diameter larger than a width of the groove of the weakened part 35 and which passes through the panel body 5.

When the expanding force of the air bag 17 is exerted on the sub lid 33, the weakened part 35, due to its thinness, is broken off prior to the other parts of the panel body 5 to open the sub lid 33. Consequently, under the main opening 11 of the instrumental panel 1, a sub opening 39 can be formed integral with the main opening 11. The sub opening 39 is positioned above a glove-box 85.

An attachment 41 is mounted on the back surface of the instrumental panel 1. This attachment 41 comprises a movable part 43 which is fixed to the sub lid 33 and an immovable part 45 which is fixed to the instrumental panel 1.

Figure 4:
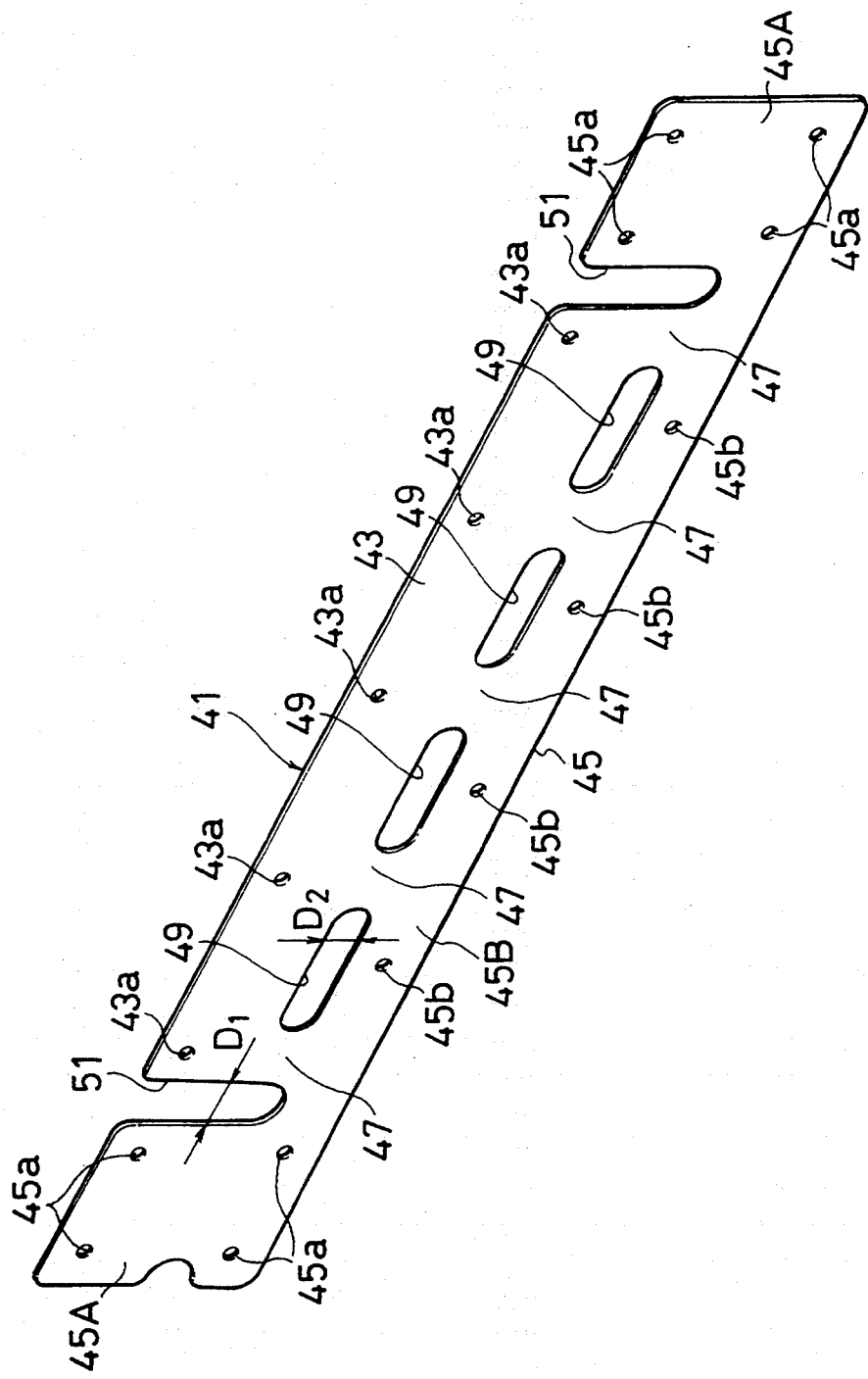
FIG. 4 is a perspective view showing an attachment of FIG. 1.

As shown in FIG. 4, the movable part 43 is shaped to be substantially rectangular. On the other hand, the immovable part 45 is substantially C-shaped to surround the movable part 43 at intervals of D1 and D2. The movable part 43 and the immovable part 45 are interconnected by five connecting parts 47 which overlie the lower breakable section 35b in an assembled state and between which an elongated slit 49 of a width of the interval D2 is arranged, respectively. Again, between the movable part 43 and the immovable part 45 along a longitudinal direction of the attachment 41, two cut-outs 51 are provided the width of the interval D1, respectively. Accordingly, the attachment 41 is adapted to be easily bent at the connecting parts 47, whereby the sub lid 33 can be bent at the lower breakable section 35b in response to a break of the lateral breakable sections 35a.

The movable part 43 of the attachment 41 is fixed to the panel body 5 of the sub lid 33, at several points of the movable part 43 by pins and so on. On the other hand, the immovable part 45 is fixed to the panel body 5 surrounding the sub lid 33 at several points. According to the first embodiment, in order to ensure the fixation, five fixing-holes 43a are formed in the movable part 43, and twelve fixing-holes 45a and 45b (four holes for each lateral immovable part 45A, four holes for a lower immovable part 45B) are formed in the immovable part 45. Therefore, the sub lid 33 having the lateral breakable sections 35a broken can be bent at the lower breakable section 35b, such that the sub lid 33 cannot be removed from the instrumental panel 1 even after the lid 33 is broken.

Next, the operation of the embodiment given above will be explained. First of all, when an inflator 13a is ignited by detecting a crush of the vehicle, the air bag 17 is inflated by gas-pressure derived from the inflator 13a, so that it begins to expand outward, breaking the casing 15. Then, when the inflating force of the air bag 17 is applied on the main lid 21, it is bent in the vicinity of the connecting part 31a with the lid-supporting member 31, whereby the main opening 11 begins to open. At the same time, the inflating force is also applied on the sub lid 33 positioned under the main lid 21, so that each lateral breakable section 35a is broken from a portion close to the main opening 11. With the progress of the breakage of the lateral breakable sections 35a, the sub lid 33 is bent about the lower breakable section 35b, whereby the sub lid 33 begins to open.

Figure 5:
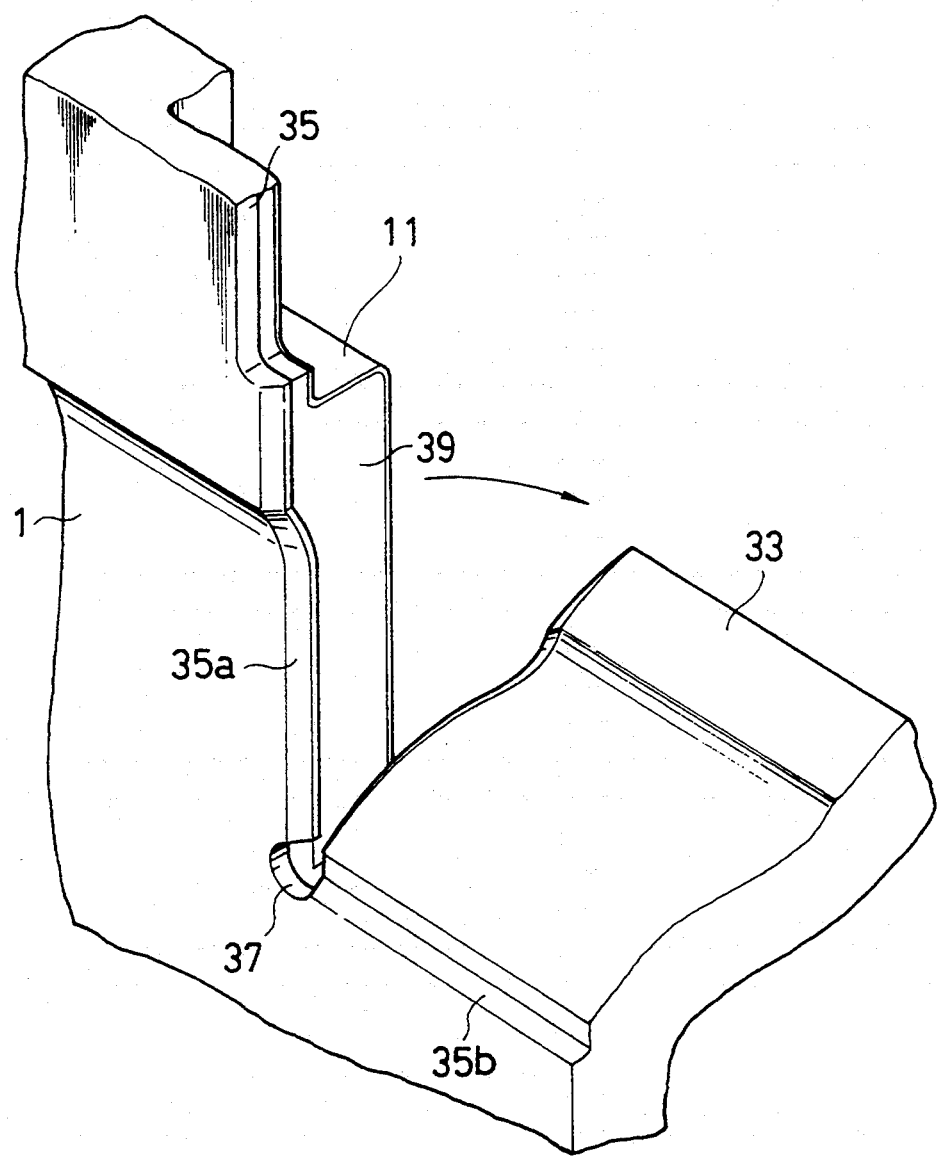
FIG. 5 is an enlarged partial view showing the opened sub lid of FIG. 1.
Figure 6:
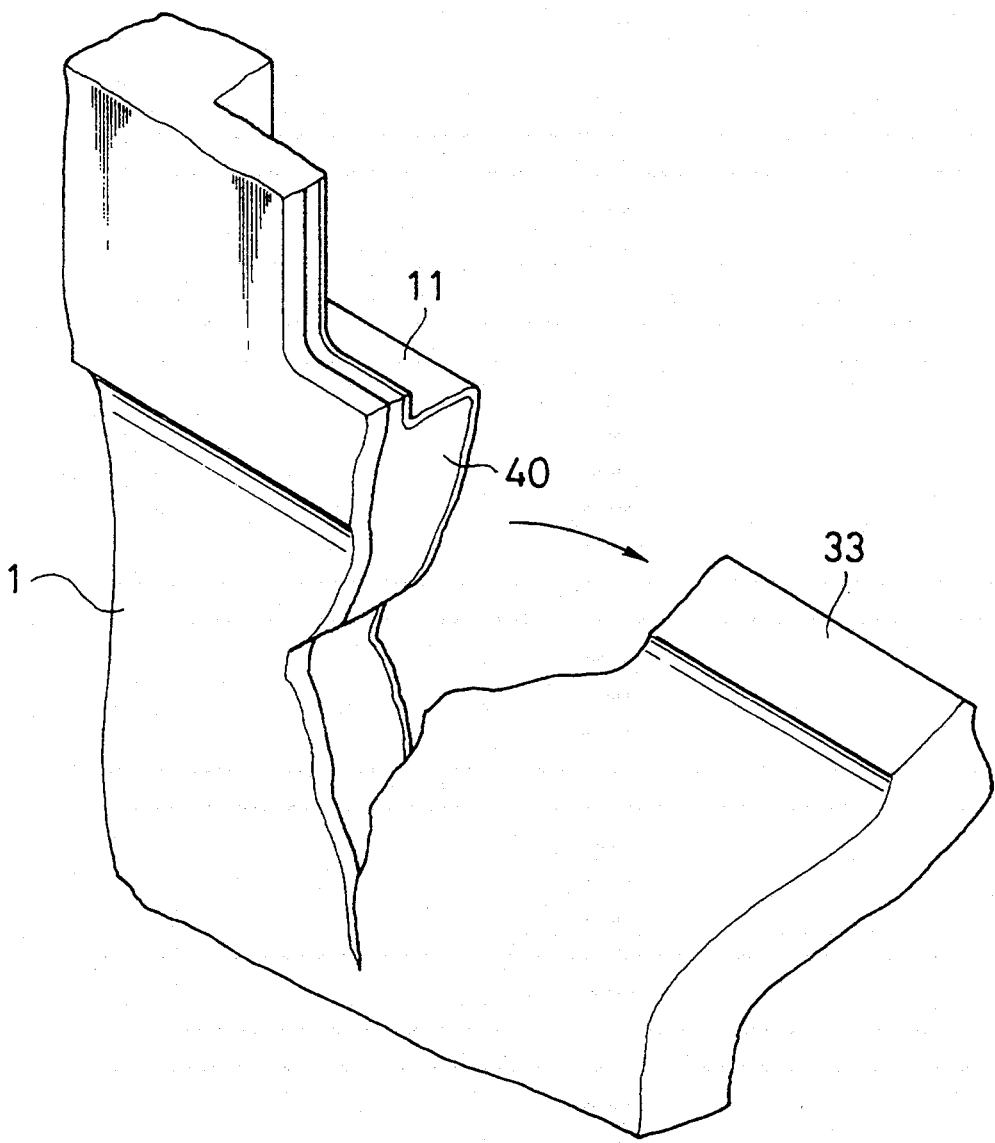
FIG. 6 is an enlarged partial view showing the opened sub lid of FIG. 5 without a weakened part.

Next, the difference between the breakage situation in case of providing the panel body 5 with the weakened part 35 and the situation without the weakened part 35 will be explained with references to FIGS. 5 and 6. In case that the weakened part 35 is not provided, there is an irregularity of the starting point of the breakage or the direction of the progress, so that a shape of a sub opening 40 will not be constant as shown in FIG. 6. On the contrary, according to the embodiment, it is possible to standardize a shape of a sub opening 39 since the breakage advances linearly along the lateral breakable sections 35a of the weakened part 35, as shown in FIG. 5. In other words, the sub opening 39 can have a size large enough to allow for a smooth and certain expansion of the air bag. Furthermore, since the breakage of the instrumental panel 1 is profiled linearly, the air bag 17 can be expanded from the sub opening 39 smoothly to thereby improve the inflating ability of the bag 17.

According to the embodiment, because the sub lid 33 is fixed to the movable part 43 of the attachment 41 at plural points, there is no possibility of removal of the sub lid 33 from the instrumental panel 1, even if a part of the lid 33 is broken off. Additionally, because the movable part 43 and the immovable part 45 are interconnected by the connecting parts 47 overlying the lower breakable section 35b and the slit 49 is formed between one connecting part 47 and the other connecting part 47, both parts 43, 45 can be easily bent in comparison with the other parts of the attachment 41. Therefore, the sub lid 33 is certain to bend at the lower breakable section 35b.

Next, the present case where the attachment 41 is mounted on the back surface of the panel body 5 will be compared with the other case where the attachment 41 is mounted on a surface of the panel body 5 facing the interior of the vehicle. If the sub lid 33 is opened in the latter case, it will be hard to deform the attachment 41 since a compression force is applied thereto, so that there may remain a possibility that the size of the sub lid 39 is not sufficient. On the contrary, in the former case of the embodiment, since a tensile strength is applied on the attachment 41 at the bending of the sub lid 33, the movable part 43 can follow the opening movement of the sub lid 33, so that the attachment can be easily deformed at the connecting parts 47. Therefore, the mounting of the attachment 41 on the back surface of the panel body 5 makes it possible to provide the sub opening 39 of a desired size.

The more the sub lid 33 is deformed, the more the opening degree of the sub opening 39 is increased, so that the breakage finally reaches the through holes 37. At this time, since a stress concentration is moderated by the holes 37, there is no possibility that the breakage advances up to the instrumental panel 1 under the holes 37.

When the main opening 11 opens fully and the sub opening 39 is fully formed by the sufficient opening movement of the sub lid 33, the air bag 17 expands into the interior of the vehicle through the main opening 11 and the sub opening 11 as one opening.

In this way, according to the first embodiment, because the sub opening 39 is also produced in addition to the conventional main opening 11 when the air bag 17 is inflated, an opening large enough to inflate the air bag 17 can be obtained even if the size of the main opening 11 is small. Further, because the main opening 11 can be formed smaller than the conventional opening, the main lid 21 and the main opening 11 are formed with a high dimensional accuracy. This high dimensional accuracy improves the assembly quality and compatibility between the instrumental panel 1 and the main lid 21.

Figure 7:
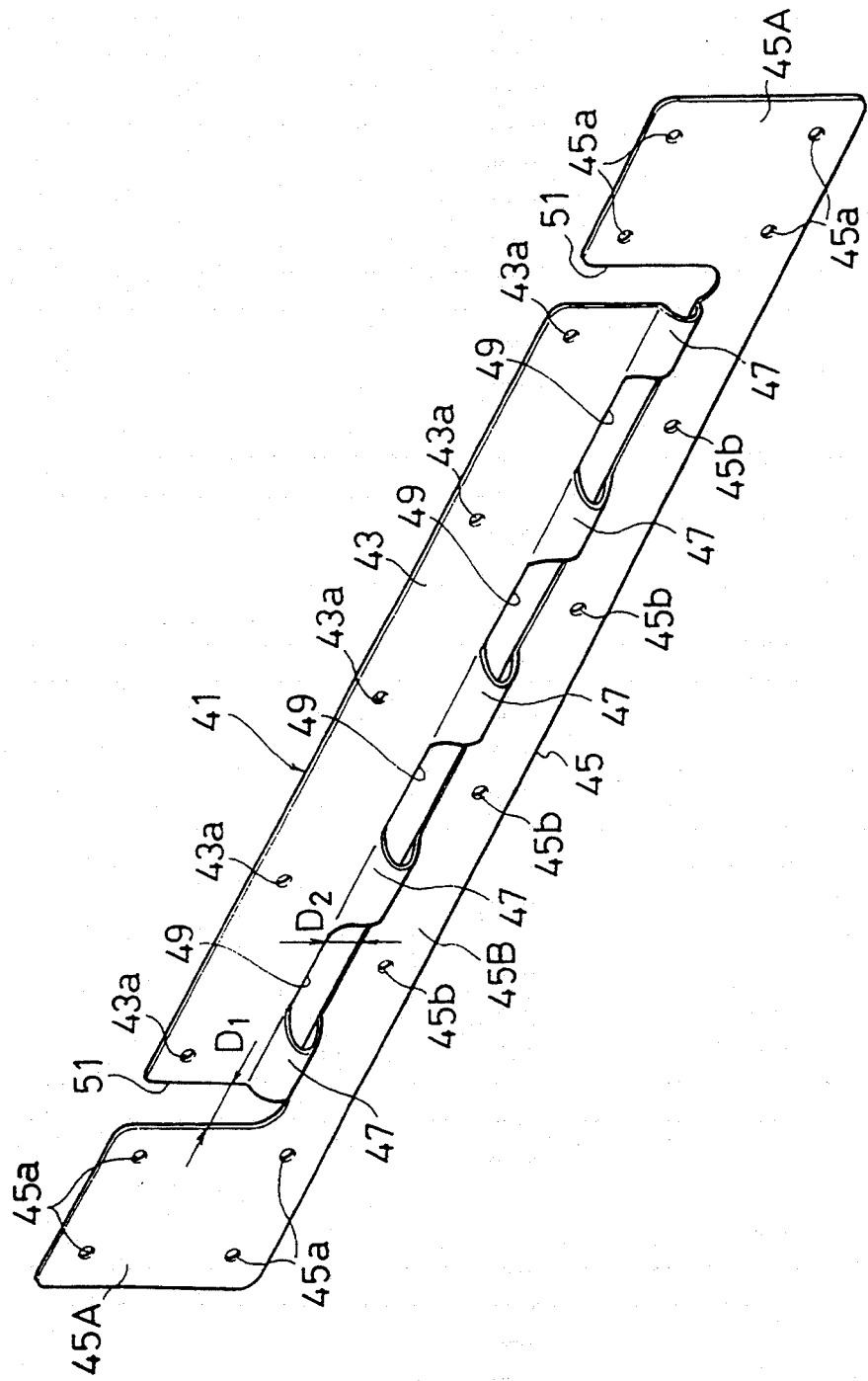
FIG. 7 is a perspective view showing an attachment according to a second embodiment of the present invention.
Figure 8A:
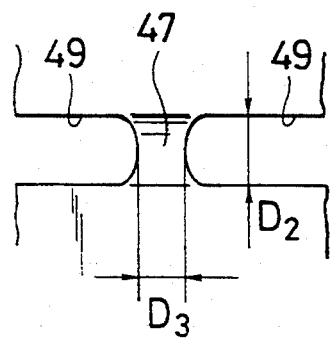
Figure 8B:
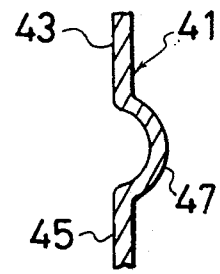
Figure 9:
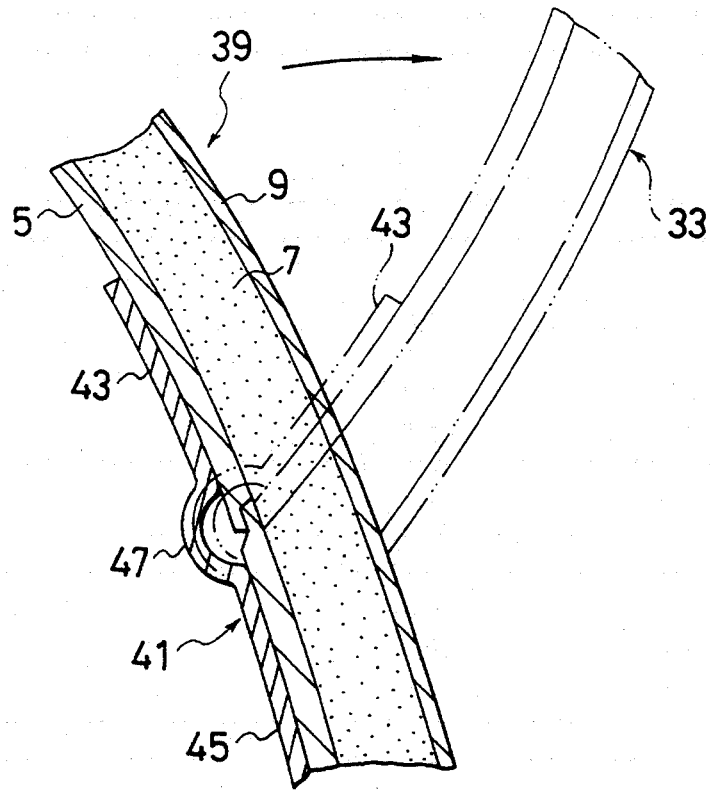
FIG. 9 is an enlarged sectional view showing the sub lid with the attachment of FIG. 7 in the process of deforming.

FIGS. 7 to 9 show the other embodiment of the attachment 41. Note that, through the figures, the elements similar to those of FIG. 4 are indicated by the same reference numerals.

In this second embodiment, as shown in FIGS. 7 and 8B, each of the connecting parts 47 is formed as a bead having a semi-circular section and protruding in one direction. As shown in FIG. 8A, the width of the narrowest portion of the bead is if dimension D3. The attachment 41 is mounted in such a manner that all connecting parts 47 protrude from the back surface of the panel body 5 in one direction. Accordingly, due to such formation of a bead, the attachment 41 in this embodiment can bend easier than the flat attachment 41 in the first embodiment, so that the sub lid 33 can certainly bend at the lower breakable section 35b.

Furthermore, according to the embodiment, even when the movable part 43 approaches the immovable part 45 and vice versa, the connecting parts 47 can be displaced following such movements of the movable part 43. That is, as shown in FIG. 9 with a double-dotted line, the movable part 43 of the attachment 41 can follow the sub lid 33 easily, whereby the sub opening 39 can be formed to be a more stable size. Additionally, due to the easy following of the movable part 43 to the sub lid 33, it is also possible to decrease a burden applied on fastening portions between the attachment 41 and the panel body 5, so that the removal of the sub lid 33 can surely be avoided.

Figure 10:
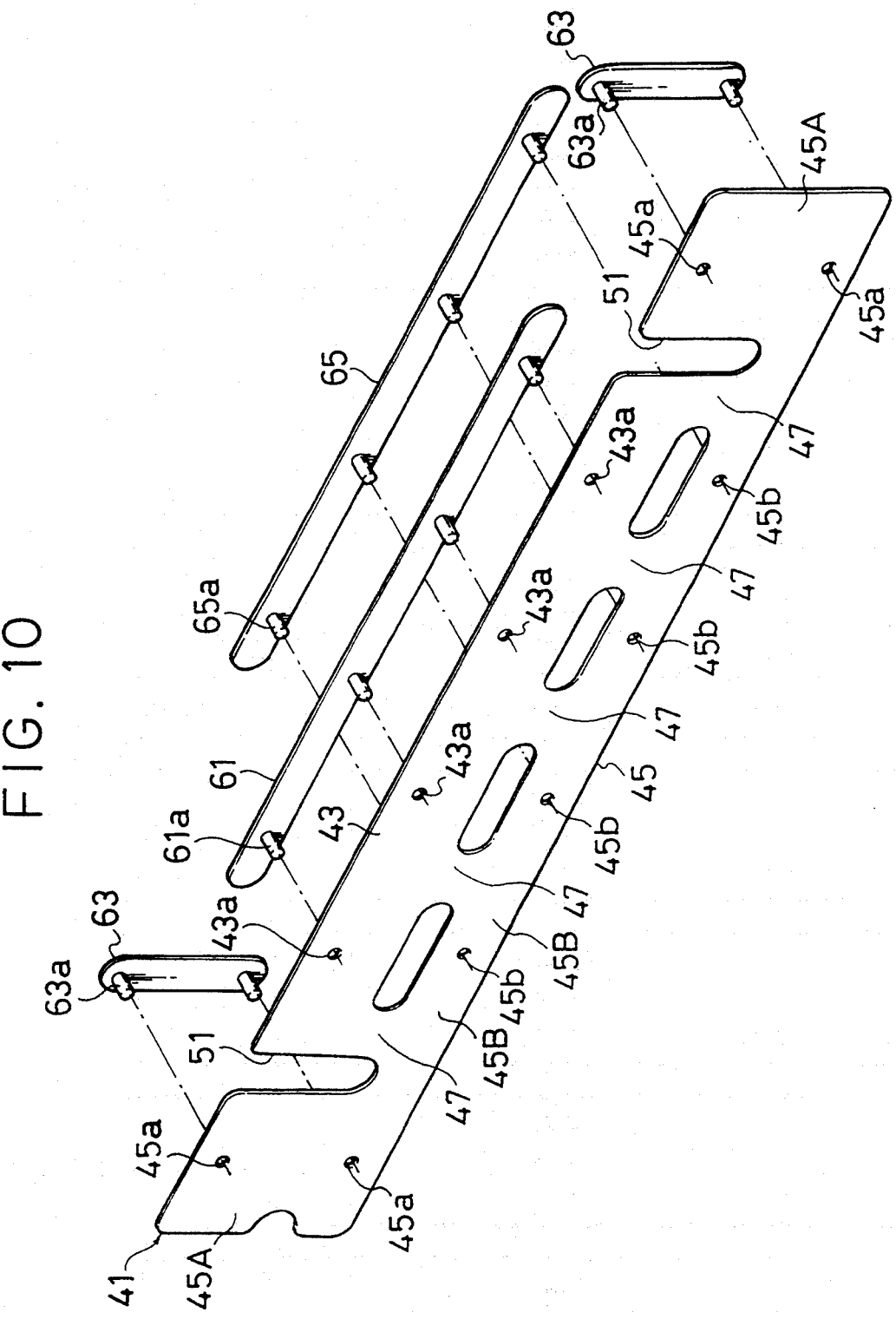
FIG. 10 is a perspective view showing an attachment according to a third embodiment of the present invention.
Figure 11:
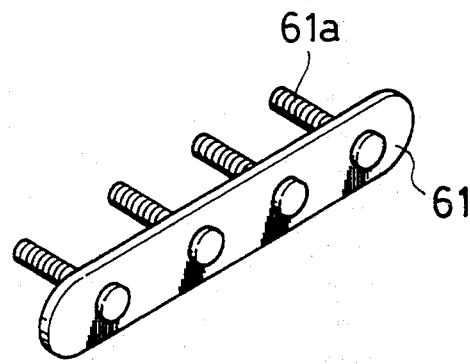
FIG. 11 is a perspective view showing a first retainer of FIG. 10.
Figure 12:
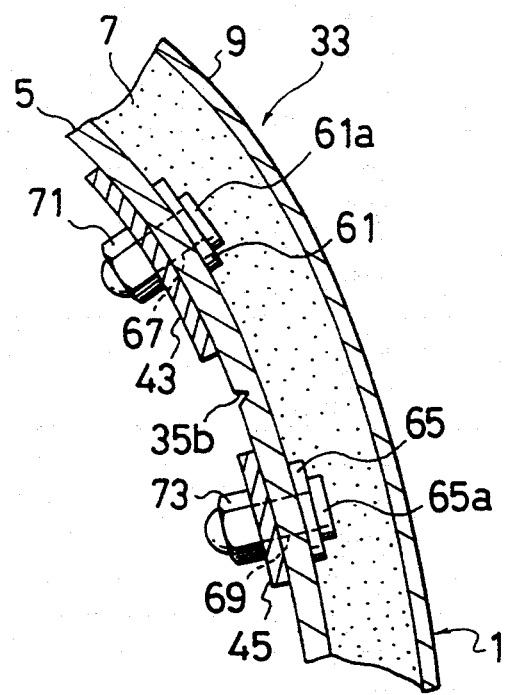
FIG. 12 is an enlarged sectional view showing the attachment of FIG. 10 in an assembled state.

FIGS. 10 to 12 show the third embodiment of the attachment 41.

In the embodiment, four fixing-holes 43a are formed in the movable part 43, and eight fixing-holes 45a and 45b (two holes for each lateral immovable part 45A, four holes for a lower immovable part 45B) are formed in the immovable part 45. The movable part 43 is fixed to the panel 1 through the intermediary of a first retainer 61 shown in FIGS. 10 and 11. The first retainer 61 is provided with four bolts 61a as fasteners, each of which is arranged corresponding to each of the fixing-holes 43a.

On the other hand, the immovable part 45 is fixed to the panel 1 via second retainers 63, 65. Each of the second retainers 63 fixing the lateral immovable parts 45A is provided with two bolts 63a as fasteners, each of which is arranged corresponding to each of fixing-holes 45a. The second retainers 65 fixing the lower immovable part 45B is provided with four bolts 65a. The first retainer 61 and the second retainers 63, 65 of thin plates are formed in such a manner that surfaces in opposition to the bolts 61a, 63a, 65a are generally flat.

As shown in FIG. 12, the first retainer 61 is arranged inside of the sub lid 33 and each bolt 61a passes through a hole 67 formed in the panel body 5. By this arrangement, the first retainer 61 can be anchored to the panel body 5, whereby each bolt 61a protrudes from the back surface of the sub lid 33. Similarly, the second retainer 65 (63) is arranged inside of the instrumental panel 1 and each bolt 65a (63a) passes through a hole 69 in the panel body 5. Accordingly, the second retainer 65 (63) can be also anchored to the panel body 5, so that each bolt 65a (63a) protrudes from the back surface of the instrumental panel 1. Then, by tightening nuts 71, 73 against the protruding bolts 61a, 65a, the movable part 43 and the immovable part 45 are secured to the sub lid 33 and the instrumental panel 1, respectively.

As mentioned above, according to the embodiment, since the mounting of the attachment 41 to the panel body 5 can be attained by tightening the nuts 71, 73 on the back surface of the panel body 5, the assembling workability can be improved in comparison with using blind-rivets penetrating the panel 1. Further, since the first retainer 61 and the second retainers 63, 65 are constituted by thin plates, the resin material can be flowed smoothly during forming of the pad 7, so that the molding quality thereof can be improved. Due to the engagement of the nuts 71, 73 with the retainers 61, 63, 65, it is possible to fix the attachment 41 to the panel 5.

In addition, in the third embodiment, since all bolts 61a, 63a, 65a are held by the retainers 61, 63, 65 supporting the attachment 41 with their planes, the mounting of the attachment 41 to the panel body 5 can be reinforced, so that the removal of the sub lid 33 can surely be avoided.

Figure 13:
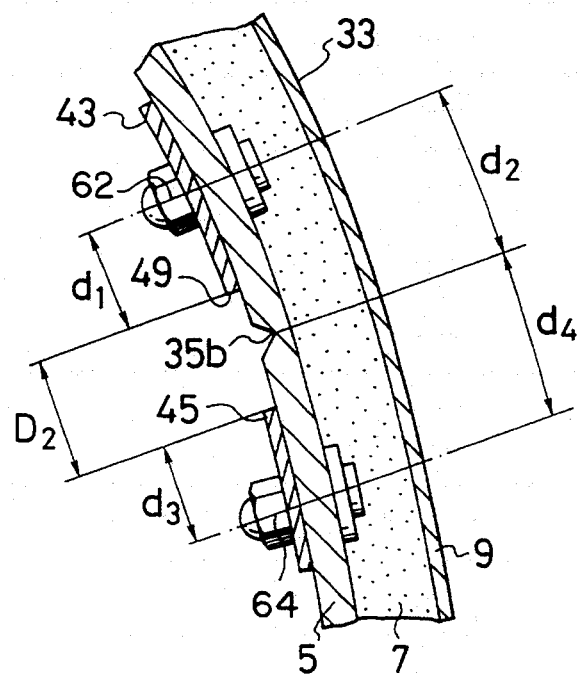
FIG. 13 is an enlarged sectional view showing an assembled attachment according to a fourth embodiment of the present invention.
Figure 14:
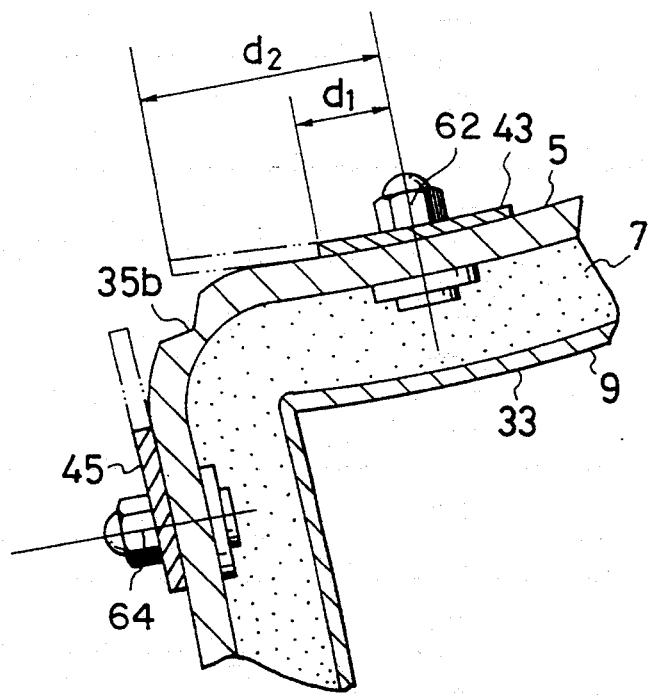
FIG. 14 is an enlarged sectional view showing the attachment of FIG. 13 in a deformed state.

FIGS. 13 and 14 show the fourth embodiment of the attachment 41.

In common with the aforementioned embodiments, as shown in FIG. 13, the width D2 of the slit 49 is decided by one distance d1 between a tightening part 62 and the edge of the movable part 43 and the other distance d2 between a tightening part 64 and the edge of the immovable part 45.

According to the fourth embodiment of the invention, the tightening part 62 on a movable side and the tightening part 64 on an immovable side are positioned so that distances d2, d4 from the lower breakable section 35b are in excess of a predetermined value. The reason why the distances d2, d4 are defined is that, if the distances d2, d4 are too short, there may be produced cracks extending from the lower breakable section 35b to the tightening parts 62, 64 when the section 35b is broken, whereby the tightening condition of the attachment 41 may be influenced to be unstable.

In this embodiment, the distances d1, d3 are established in such a manner that the marginal parts of the parts 43, 45 are not apart from the back surfaces of the panel body 5 in the opening operation of the sub lid 33. That is, in other words, the width D2 of the slit 49 is also established in such a manner that the marginal parts, which are defined by the slits 49, can follow the back surfaces of the panel body 5 in the opening operation of the sub lid 33.

Due to such establishments as mentioned above, even if the panel body 5 is bent as shown in FIG. 14, there is no possibility that the edge of the movable part 45 comes apart from the back surface of the panel body 5 as shown in FIG. 14 with double-dotted lines. Consequently, the attachment 41 does not interfere with the air bag 17 passing through the sub opening 39, and thus the inflating ability of the air bag 17 can be improved.

Finally, it will be understood by those skilled in the art that the foregoing description of the preferred embodiments of the disclosed structure, and that various changes and modifications may be made to the present invention without departing from the spirit and scope thereof.

What is claimed is:

1. A lid structure for an air bag system of a vehicle, comprising:
a main opening provided in an instrumental panel for said vehicle, said main opening being adapted so that an air bag of said system passes through said main opening when inflating said air bag;
a main lid provided integral with said instrumental panel for closing said main opening, said main lid being opened by said air bag in the process of inflating;
a sub lid defined by a weakened part of said instrumental panel to be easily broken by said air bag, said sub lid being integral with said instrumental panel, said weakened part extending from said main opening, whereby said weakened part is broken by an inflating force of said air bag acting on said sub lid to thereby cause said sub lid to be opened to form a sub opening which is integral with said main opening; and
an attachment provided on a back surface of said instrumental panel, said attachment comprising a movable part fixed to said sub lid and an immovable part having a first part connected to said movable part and a second part fixed to said instrumental panel;
wherein said instrumental panel includes a panel body, the lid structure further comprising:
a first retainer anchored to said panel body inside of said sub lid, said first retainer having a plurality of fasteners, each said fastener having a tip passing through said panel body and protruding from a back surface of said sub lid; and
second retainers anchored to said panel body inside of said instrumental panel adjacent said sub lid, each of said second retainers having a plurality of fasteners, each said fastener having a tip passing through said panel body and protruding from a back surface of said instrumental panel adjacent said sub lid, said movable part being secured to said fasteners protruding from said back surface of said sub lid, and said immovable part being secured to said fasteners protruding from said back surface of said instrumental panel adjacent said sub lid.

2. A lid structure as claimed in claim 1, wherein said attachment has slits formed between said movable part and said immovable part.

3. A lid structure for an air bag system of a vehicle, comprising:
a main opening provided in an instrumental panel for said vehicle, said main opening being adapted so that an air bag of said system passes through said main opening when inflating said air bag;
a main lid provided integral with said instrumental panel for closing said main opening, said main lid being opened by said air bag in the process of inflating;
a sub lid defined by a weakened part of said instrumental panel to be easily broken by said air bag, said sub lid being integral with said instrumental panel, said weakened part extending from said main opening, whereby said weakened part is broken by an inflating force of said air bag acting on said sub lid to thereby cause said sub lid to be opened to form a sub opening which is integral with said main opening; and
an attachment provided on a back surface of said instrumental panel, wherein said attachment comprising a movable part fixed to said sub lid and an immovable part having one part connected to said movable part and a second part fixed to said instrumental panel, wherein said weakened part is provided at breakage ends thereof with through holes which serve to stop further progress of breakage of said weakened part; and
wherein said instrumental panel includes a panel body, the lid structure further comprising:

a first retainer anchored to said panel body inside of said sub lid, said first retainer having a plurality of fasteners, each said fastener having a tip passing through said panel body and protruding from a back surface of said sub lid; and second retainers anchored to said panel body inside of said instrumental panel adjacent said sub lid, each of said second retainers having a plurality of fasteners, each said fastener having a tip passing through said panel body and protruding from a back surface of said instrumental panel adjacent said sub lid, said movable part being secured to said fasteners protruding from said back surface of said sub lid, and said immovable part being secured to said fasteners protruding from said back surface of said instrumental panel adjacent said sub lid.

4. A lid structure as claimed in claim 3, wherein said attachment has slits formed between said movable part and said immovable part.

5. A lid structure for an air bag system of a vehicle, comprising:

a main opening provided in an instrumental panel for said vehicle, said main opening being adapted so that an air bag of said system passes through said main opening when inflating said air bag;

a main lid provided integral with said instrumental panel for closing said main opening, said main lid being opened by said air bag in the process of inflating;

a sub lid defined by a weakened part of said instrumental panel to be easily broken by said air bag, said sub lid being integral with said instrumental panel, said weakened part extending from said main opening, whereby said weakened part is broken by an inflating force of said air bag acting on said sub lid to thereby cause said sub lid to be opened to form a sub opening which is integral with said main opening; and an attachment provided on a back surface of said instrumental panel, said attachment comprising a movable part fixed to said sub lid, an immovable part fixed to said instrumental panel, beaded connecting parts through which said movable part is connected with said immovable part, said beaded connecting parts protruding from said back surface of said instrumental panel, and a plurality of slits arranged between said movable part and said immovable part, each of said slits being arranged between said beaded connecting parts adjacent said weakened part.

* * * * *